*F. W. Witting,*

*Wind Wheel.*

N° 16,893.   Patented Mar. 24, 1857.

UNITED STATES PATENT OFFICE.

F. W. WITTING, OF TWELVE MILE, COLETTO GIN, TEXAS.

IMPROVED MODE OF REGULATING THE VELOCITY AND FURLING THE SAILS OF WIND-WHEELS.

Specification forming part of Letters Patent No. 16,893, dated March 24, 1857.

*To all whom it may concern:*

Be it known that I, FREDERICK W. WITTING, of Twelve Mile, Coletto Gin, in the county of De Witt and State of Texas, have invented a new and Improved Windmill; and I do hereby declare that the following is a full, clear, and exact description of the same, reference being had to the annexed drawings, making a part of this specification, in which—

Figure 1:
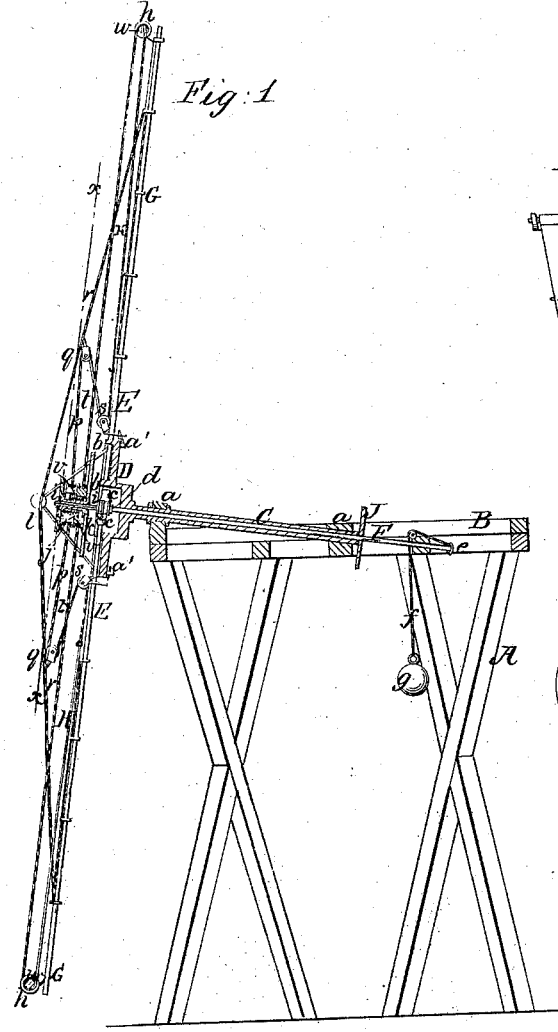
Figure 2:
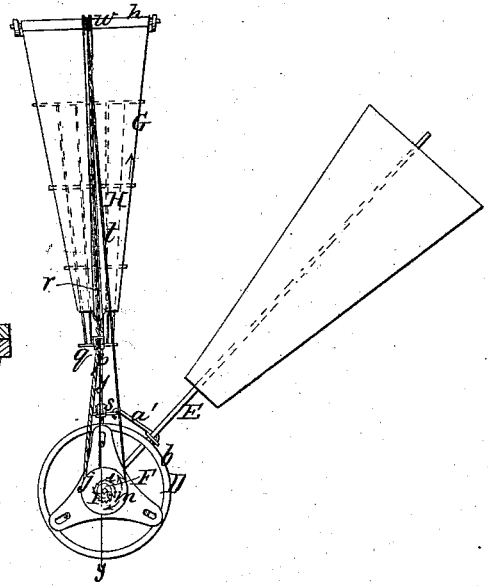
Figures 3, 4:
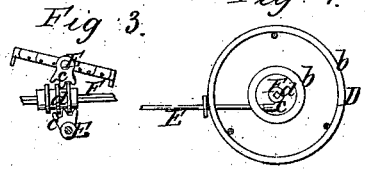
Figures 5, 6:
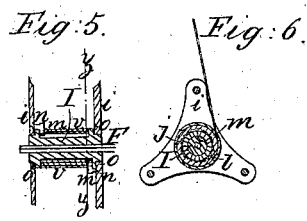

Figure 1 is a vertical section of my improvement, $y\ y$, Fig. 2, showing the plane of section. Fig. 2 is a front view of a portion of the windmill, the front end of the shaft being bisected, as indicated by the line $x\ x$, Fig. 1. Fig. 3 is a detached view of the gearing by which the sails are turned more or less obliquely to the wind. Fig. 4 is a front view of the hub to which the sail-spindles are attached. Fig. 5 is a longitudinal section of the device by which the sails are folded and unfolded. Fig. 6 is a transverse section of the same, $z\ z$, Fig. 5, showing the plane of section.

My invention consists in the peculiar arrangement of parts or the means employed for regulating the sails whereby they may by the action of the wind be turned more or less obliquely with it and cause the wheel to rotate with equal speed, however much the wind may vary in velocity.

My invention also consists in the peculiar means employed for folding and unfolding the sails, as will be hereinafter fully shown and described.

To enable those skilled in the art to fully understand and construct my invention, I will proceed to describe it.

A represents a framing, on the upper end of which a rotating cap B is placed, said cap being allowed to turn freely on the framing.

C represents a hollow shaft which is fitted in suitable bearings $a\ a$ on the cap B. The outer end of the shaft C has a hub D attached to it, and spindles E are fitted radially in said hub, the lower ends of the spindles passing through annular ledges $b$ on the face or outer side of the hub and every alternate spindle having part pinions or segments $c$ on its lower end. These part pinions or segments $c$ gear into a cylindrical rack $d$ on the outer end of a rod F, which is fitted loosely within the shaft C, the inner end of the rod bearing against a plate or step $e$, which has a cord or chain $f$ attached to it, a weight $g$ being attached to the lower end of the cord or chain.

The spindles E have each a light frame G attached to them. These frames gradually increase in width from their inner to their outer ends, as shown clearly in Fig. 2. The frames are attached to the spindles rather out of center, so that the wind will act more powerfully at one side than at the other and have a tendency to turn the spindles, so that the frames will be presented obliquely to the wind. The frames of the spindles having pinions at their lower ends are connected by links $a'$ to those spindles which have no pinions attached to them. (See Figs. 1 and 2.)

H represents the sails, which are constructed of canvas, the upper ends of the sails being attached to rollers $h$ at the outer ends of the frames.

From the above description of parts it will be seen that the weight $g$ is the exponent of the power of the wind-wheel, as the weight serves to counteract the force of the wind against the sails and keeps the sails presented to the wind at the proper angle, which of course will vary more or less according to the velocity of the wind, a high wind overcoming the gravity of the weight and turning the sails in quite an oblique position, so that the whole effective force of the wind cannot act against the sails. During a light wind the weight will keep the sails in a less oblique position toward the wind. By this means the wind-wheel is made to rotate with an equal speed, however much the wind may vary in velocity.

The rod F, it will be understood, turns with the shaft C and also is allowed to slide longitudinally within it. On the outer end of the rod F a cylinder I is permanently attached. This cylinder is placed between two plates $i\ i$ on the rod F, and on the cylinder I two drums $j\ k$ are fitted. The inner peripheries of the drums have ratchet-teeth $l$ formed on them, the teeth of one drum being in a reverse direction to those on the other, and pawls $m\ m$ on the cylinder I catch into the teeth on the drums. The pawls $m$ have each an arm or projection $n$ on them, and these arms catch into or between teeth $o$ on the inner sides of the plates $i\ i$. (See Fig. 5.) To the outer drum $j$ cords $p$ are attached. These cords pass through pulleys or cords $q$, attached to cords $r$, which are secured to the frames G, one to each, and the ends of the cords pass through blocks S, attached to the lower ends of the spindles, and are attached to the lower ends of the sails H. (See more particularly Fig. 1.) To the inner drum $k$ cords $t$ are attached. These cords pass around pulleys $u$ on the rollers $h$ at the outer ends of the frames G, and to which rollers the outer ends of the sails are attached, as previously mentioned.

To the inner end of the rod F a hand-wheel J is attached. By turning this wheel to the left the outer drum $j$ will be turned in the same direction, while the inner drum $k$ will be allowed to turn in the reverse direction as its pawl moves from the rake of its teeth, by means of its arm $n$, which is pressed between the teeth $o$ on plate $i$, remaining there and causing the pawl $m$ to slip into its cavity. After this the arm $n$ will slip over the teeth $o$ till the sails are unfurled.

Small springs $i\ i$, attached to the plates $i\ i$, press against the circumference of the drums and prevent them, when loose or turning in a reverse direction to the rod F, from working too freely.

Having thus described my invention, what I claim as new, and desire to secure by Letters Patent, is—

1. Connecting the spindles E to the sliding rod F by means of the part pinions or segments $c$ and rack $d$, arranged as herein described; but I disclaim the spindles so arranged as to turn in their hub, and also the weight when not used in connection with the segments and rack.

2. Furling and unfurling the sails H by means of the drums $j\ k$, attached to the rod F, and the cords $p\ t$, attached to the drums and sails, as herein shown and described.

F. W. WITTING.

Witnesses:
CHARLES WUNDT,
I. VON ROEDER.